United States Patent Office 3,660,326
Patented May 2, 1972

3,660,326
POLYURETHANE PREPOLYMER COMPOSITION CONTAINING THE REACTION PRODUCT OF A CARBOXYLIC ACID AND A MONOMERIC ISOCYANATE
John J. Mallabar, Solihull, England, assignor to The Dunlop Company, London, England
No Drawing. Filed May 20, 1969, Ser. No. 826,263
Claims priority, application Great Britain, May 21, 1968, 24,074/68
Int. Cl. C08g 22/04
U.S. Cl. 260—18 TN                14 Claims

ABSTRACT OF THE DISCLOSURE

A polyurethane prepolymer composition comprising a polyurethane prepolymer and the reaction product of a carboxylic acid with a monomeric isocyanate. Also the method for producing shaped articles which comprises forming into the desired shape and at least partially curing a foamable composition consisting of the polyurethane prepolymer composition plus a polyfunctional amine curative.

---

This invention relates to polyurethane compositions and to the production of articles therefrom.

It has previously been proposed to prepare articles of polyurethane rubbers and plastics by first reacting a polymeric polyol such as a polyester or a polyether with excess of polyisocyanate to form a prepolymer and then mixing the prepolymer with a polyfunctional amine curative and liquid-casting the mixture. Unfortunately systems of this type which are acceptable as regards fluidiity, toxicity, cost and eventual polymer quality are often slow in developing the required gel strength for them to be removed from moulds without damage.

It has also previously been proposed to add acids to such systems by mixing with the prepolymer or curative to shorten the setting and demoulding times. The presence of acid in the polymer, however, tends to impair the hydrolytic ageing resistance of the polurethane rubber or plastic.

According to the present invention a polyurethane prepolymer composition comprises a polyurethane prepolymer and the reaction product of a carboxylic acid with a monomeric isocyanate.

According to the present invention also a process for the production of a shaped article comprises forming into the desired shape a formable composition comprising the polyurethane prepolymer composition described in the immediately-preceding paragraph and a polyfunctional amine curative, and at least partially curing the formable composition.

According to the present invention also a process for the production of a moulded particle includes inserting into a mold a formable composition comprising a polyurethane prepolymer composition as described above and a polyfunctional amine curative, and at least partially curing the formable composition in the mould.

The polyurethane prepolymer is the reaction product of a polymeric polyol such as a polyether or polyester with excess of a polyisocyanate. Examples of polymeric polyols which may be used are straight or branched chain-polymers having terminal and/or pendant hydroxy groups on a backbone of polyester, polyether, polythioether (polyepisulphide), hydrocarbon, silicone or other known chemical type, for example, polyethylene adipates, polycarprolactones, polypropylene glycols, polytetrahydrofuranes, polybutadiene, butadiene/styrene copolymers, butadiene/acrylonitrile copolymers, polyisoprene, polypropylene sulphide, ethylene sulphide/propylene sulphide copolymers, and various copolymers of the above species such as polyether-esters, polyether-thioethers, caprolactone-polyether block copolymers, polypropylene glycol-acrylonitrile graft copolymers. The polyisocyanate may be aromatic or aliphatic and examples of polyisocyanates which may be used are tolylene diisocyanates, diphenylmethane diisocyanate, paraphenylene diisocyanate, metaxylylene diisocyanate, hexamethylene diisocyanate, dicyclohexylmethane diisocyanate, naphthalene diisocyanate, tetramethylene diisocyanate, decamethylene diisocyanate, cumene diisocyanate, toluene triisocyanate, triphenylmethane triisocyanate.

The mixture of a polyurethane prepolymer and the reaction product of a carboxylic acid with a monomeric isocyanate is preferably prepared by adding the carboxylic acid to the polymeric polyol and then adding at least sufficient isocyanate to react with both the polymeric polyol and the carboxylic acid. The isocyanate, acid and polyol are then preferably heated together for several hours in order to complete the reaction of the isocyanate with the OH and COOH groups. The temperature at which this reaction is carried out and the duration of the heating will depend upon the actual compounds used but generally the temperature will be in the range 40° C. to 120° C. preferably 70° C. to 110° C. and the time will be in the range 1 hour to 3 days depending on the temperature used.

When the polyisocyanate, acid and polyol are heated together as mentioned above the polyisocyanate will react with COOH and OH groups on acid and polyol molecules to form the said reaction product and the prepolymer respectively. In some cases, of course, a molecule of polyisocyanate may react with the polyol and the acid so that the reaction product of the isocyanate and the acid is chemically linked to the prepolymer.

The carboxylic acid may be a monocarboxylic acid or a polycarboxylic acid. Examples of carboxylic acids which may be used are saturated monocarboxylic acids such as acetic, propionic, and higher acids of this homologous series e.g. stearic acid; saturated dicarboxylic acids such as malonic, succinic and higher homologues e.g. sebacic acid, unsaturated carboxylic acids such as maleic, fumaric and higher unsaturated acids, tartaric acid, citric acid, malic, acid, benzoic acid, phthalic acid, salicyclic acid, lactic acid, and monochloroacetic acid.

The polyfunctional amine curvative may be a primary amine, a secondary amine or a mixed primary/secondary amine and should be free from other active-hydrogen-atom-containing groups, e.g. OH, COOH. It is preferably a diprimary or disecondary amine. Examples of suitable amine curatives are methylene-bis-orthochloroaniline, methylene-bis-aniline, tolylene diamines, phenylene diamines, menthane diamine, hexamethylene diamine, piperazine, 2-methylpiperazine, naphthalene diamine, monochlorophenylene diamines, dichlorophenylene diamines, dimethylphenylene diamines, N,N'-disec.-butylphenylene diamine, N,N' - dihexylphenylene diamine, N,N'-diphenylethylene diamine.

The formable composition may be prepared by adding the polyfunctional amine curative to the mixture of a polyurethane prepolymer and the reaction product of a carboxylic acid with a monomeric isocyanate. Preferably the composition is inserted into a mould immediately after it has been prepared since curing of the composition begins as soon as the polyfunctional amine curative comes into contact with the polyurethane prepolymer composition.

Alternatively, the formable composition may be cast into a desired shape or used as a coating composition.

If it is desired to produce articles or coatings of polyurethane foam the polyurethane prepolymer composition may be foamed before the polyfunctional amine curative has been added to the formable composition containing the curative may be foamed before and/or during the forming step.

The foaming may be accomplished by well-known methods such as incorporation of an inert gas under pressure e.g. air, carbon dioxide, or incorporation of a blowing agent e.g. trichlorofluoromethane.

If desired there may be included in the formable composition a solid material such as sodium chloride which is inert to the remainder of the composition but which can be leached from the composition. Leaching of this solid material from the composition after curing may be carried out to produce microporosity in the cured composition.

The mould and/or the composition may be pre-heated to an elevated temperature to accelerate the cure of the composition, and/or for the same purpose, heat may be applied to the composition within the mould.

The polyurethane prepolymer compositions of this invention may, with advantage, be used in the moulding of shoe soles, particularly when the formable composition is foamed to give a fine-pored structure.

Shoe soles comprising a foamed formable composition may be moulded directly on to shoe uppers, the formable composition being inserted into a shoe-sole mould which is closed by a last carrying a shoe upper before the formable composition has been cured. The formable composition is then cured in contact with the shoe upper so that the moulded sole adheres to the upper and a shoe is produced.

The invention is illustrated by the following examples in which all "parts" are parts by weight.

EXAMPLE I

Three prepolymers, A, B and C were prepared from a polypropylene ether diol of average molecular weight 1285 and a mixture of 80 parts of 2:4-tolylene diisocyanate and 20 parts of 2:6-tolylene diisocyanate. In each case 100 parts of the polyether was stirred under a nitrogen blanket with a particular number of parts of the isocyanate, heated to 70° C. over a period of about one hour and then held at this temperature for a further 15 hours with the stirrer stopped. On cooling to room temperature all three prepolymers were then liquid syrups. Prepolymer A was made with 27.2 parts of isocyanate and had an NCO group content of 4.9%. Prepolymer B embodied 1.2 parts of glacial acetic acid preblended with the polyether, the isocyanate being increased to 30.6 parts to provide an extra two NCO groups for every COOH group of the acetic acid. Its NCO content was 5.65% which is consistent with the reaction of each COOH with one NCO group. Prepolymer C was made with 28.9 parts of isocyanate and contained no acetic acid. Its NCO group content was 5.60% as expected. Prepolymer A was divided into two portions and one of these was mixed at room temperature a few minutes before use with glacial acetic acid in the proportion of 1.2 parts per 100 parts of initial polyether content. This mixture was designated prepolymer A¹, and was taken as having an NCO group content of 4.9%.

Each of these four prepolymers was rapidly hand-stirred at room temperature with the liquid amine curative Trial Product LK-1443 in a proportion calculated in each respective case to give a stoichiometrical $NH_2$/NCO ratio of 0.8 LK-1443 is supplied by Farbenfabriken Bayer and consisting substantially of a mixture of isomers of diethyltolylene 2.4-diamine. The actual proportions of LK-1443 per 100 parts of prepolymers A, B, C and A¹ respectively, were 8.3 parts, 9.57 parts, 9.50 parts and 8.3 parts.

The resulting four prepolymer/curative mixtures were each poured immediately into axially rotating horizontal cylindrical moulds at 100° C., these moulds having previously been coated with silicone release agent. Each mix became centrifugally distributed in the form of a cylindrical tube. Probing tests with a spatula revealed the respective times required to set to a solid polyurethane, and then, having stopped the rotation, tentative and complete stripping of the products from the moulds revealed the respective times required for demoulding without distortion (due to excessive residual plasticity) and tearing (due to inadequate development of strength). These observations are summarised in the following table:

| Formulation | Behavior | |
| --- | --- | --- |
| | Setting time (seconds) | Time for demoulding without appreciable damage (minutes) |
| Prepolymer A (uncatalysed control) | 360 | 30 |
| Prepolymer B (catalyst of the invention) | 35 | 1.5 |
| Prepolymer C (uncatalysed control with increased isocyanate) | 270 | 25 |
| Prepolymer A ¹ (control with acid added) | 75 | 4.5 |

In all cases cure was then completed by a period of storage at room temperature and/or some hours heating in a 100° C. oven. The products of the invention were elastomers showing no inferiority in mechanical properties as compared with the uncatalysed controls either initially or after ageing in a steam autoclave at 115° C. for 30 hours at 10 p.s.i. gauge pressure, or in water-vapour-saturated air at 70° C. for 1 month.

EXAMPLE II 100 parts of the 1285 m./wt. polypropylene ether diol of Example I was freed from any traces of water present by heating it under nitrogen for two hours at 105° C. and 6 mm. mercury pressure. It was then blanketed with nitrogen at atmospheric pressure and cooled to 60° C. Then 27.2 parts of the 80/20 tolylene diisocyanate isomer mixture of Example I was added and, with stirring maintained throughout, the temperature was raised to 110° C. over a period of half-an-hour and maintained at that value for a further two hours. The resulting liquid prepolymer had an NCO group content of 5.05 percent.

Using a Mark 4A Dispenser and Mark 7 Mechanical Mixer manufactured by the Viking Engineering Company, a stream of this prepolymer at 90° C. was continuously blended with a stream of the liquid diamine curative of Example I at 20° C. in the proportion of 100 parts of prepolymer to 8.56 parts of curative (i.e. $NH_2$/NCO ratio 0.8) and the mixture dispensed at a rate of 12 lb./minute into a succession of variously shaped steel moulds coated with silicone release agent and pre-heated to 95±5° C. Some of the moulds had undercut surfaces.

A similar exercise was then carried out using the same materials and procedure except that:

(1) The polyether was stirred with 3.9 parts of powdered sebacic acid which dissolved to a homogenous mixture during the subsequent dewatering step.

(Analytical checks showed that no detectable amount of esterification occurred.)

(2) The amount of isocyanate was 33.8 parts, i.e. an increase to provide two NCO groups for every COOH group of the acid.

(3) The NCO group content of the prepolymer was 6.10, i.e. very slightly in excess of the value corresponding to the reaction of each COOH group with one NCO group.

(4) The proportion of curative per 100 parts of prepolymer was 10.5, again giving an $NH_2$/NCO value of 0.8.

The following table shows the setting and curing behavious of the two systems.

| Formulation | Behaviour | | |
|---|---|---|---|
| | Setting time (seconds) | Time for demoulding without appreciable damage (minutes) | |
| | | Plain mould | Undercut mould |
| Uncatalysed control | 350 | 10 | 30 |
| Catalyst of the invention | 36 | 0.75 | 1.5 |

It will be seen that the catalyst confers over 15-fold advantage in time of demoulding simple articles, and over 20-fold advantage in the more difficult case of undercut profiles.

Ageing performance in saturated water vapour at 70° C. for one month was equally good in the case of the catalysed formulation and the uncatalysed control.

When the two experiments of this example were repeated but with substitution of various non-carboxylic acids such as acid butyl phosphate for the sebacic acid, there was no significant difference in the setting and demoulding times as between the post-addition of the acid and its chemical incorporation in the prepolymer.

EXAMPLE III

Two prepolymers, designated A and B, respectively, were prepared from the 1285 m. wt. polypropylene ether diol used in Example I and dicyclohexylmethane-4,4'-diisocyanate. In each case 100 parts of the polyether was stirred under a nitrogen blanket with a particular number of parts of the isocyanate, heated to 100° C. over a period of 1 hour and maintained at this temperature for a further six hours with the stirring stopped. On cooling to room temperature both prepolymers were liquid syrups. Prepolymer A was made with 41.1 parts of the isocyanate and had an NCO group content of 4.72%. Prepolymer B embodied 1.2 parts of glacial acetic acid preblended with the polyether, the isocyanate being increased to 46.4 parts to provide an extra two NCO groups for every COOH group of the acetic acid. Its NCO content was 5.07% which is consistent with the reaction of each COOH group with one NCO group. Prepolymer A was divided into two parts and one of these was mixed at room temperature a few minutes before use with glacial acetic acid in the proportion of 1.2 parts for 100 parts of the initial polyether content. This prepolymer was designated Prepolymer C and was taken as having an NCO group content of 4.72%.

Each of these three prepolymers was rapidly hand-stirred with the liquid diamine curative of Example I in the proportion calculated in each respective case to give a stoichiometrical $NH_2/NCO$ ratio of 0.8. The actual proportion of LK-1443 per 100 parts of prepolymers A, B and C respectively were 8.00 parts, 8.59 parts and 8.00 parts.

The resulting three prepolymer/curative mixtures were each centrifugally cast as described in Example I. The observed times of setting and demoulding are summarised in the following table:

| Formulation | Behaviour | |
|---|---|---|
| | Setting time (minutes) | Time for demoulding without appreciable damage (minutes) |
| Prepolymer A (uncatalysed control) | 30 | 75 |
| Prepolymer B (catalyst of the invention) | 2.5 | 5 |
| Prepolymer C (control with acid added) | 4 | 10 |

EXAMPLE IV 100 parts of Prepolymer B of Example I was mixed with 1 part of a silicone surfactant Silcocell EP 380 (I.C.I.). Using a Mark 4A dispenser and Mark 7 Mechanical Mixer manufactured by the Viking Engineering Co., a stream of this mixture at 90° C. was blended with a stream of the liquid diamine curative of Example I at 20° C. in the proportion of 100 parts of prepolymer to 9.57 parts of the curative ($NH_2/NCO$ ratio 0.8). At the same time, air was passed into the mixing head under a gauge pressure of 80 p.s.i. The resulting stream of foam was dispensed at the rate of 3 lb./minute into unheated steel moulds coated with silicone release agent. The foam had set after 30 seconds and was demoulded after 90 seconds. It had a density of 0.55 g./cc. with very slight skin. The pore size was extremely fine and the product was in the form of tough elastomeric slabs free from post-shrinkage.

EXAMPLE V

A prepolymer was prepared by the method described in Example I from 100 parts of the 1285 m. wt. polypropylene ether diol of Example I, 1 part of glacial acetic acid and 30.1 parts of the 80/20 tolylene diisocyanate of Example I. This prepolymer had an NCO group content of 5.45%.

100 parts of this prepolymer was mixed with 1 part of Silcocell EP 380 and 15 parts of trichlorofluoromethane. Using a Mark 4A Dispenser and a Mark 7 Mechanical Mixer manufactured by the Viking Engineering Co., a stream of mixture at 20° C. was continuously blended with a stream of the liquid diamine curative of Example I at 20° C. in the proportion of 100 parts of prepolymer to 9.24 parts of curative (i.e. $NH_2/NCO$ ratio 0.8) and the mixture dispensed into steel moulds and polystyrene moulds (all at 20° C.) at the rate of 3 lb./minute. Each mould was approximately one-tenth filled with the liquid mixture. About 45 seconds later the mixture had expanded just to fill the moulds and had set. The bulk density of the cellular product was 0.11 g./cc. exclusive of a virtually unfoamed surface skin about 1 mm. thick. The cell structure was open with roughly 40 pores per linear inch and the product was tough and resilient.

EXAMPLE VI 100 parts of Prepolymer B of Example I were mixed with 20 parts of methylene chloride. Using a Mark 4A dispenser and a Mark 7 Mechanical Mixer manufactured by the Viking Engineering Co. a stream of this mixture at 50° C. was blended with a stream of the liquid diamine curative of Example I at 20° C. in the proportion of 100 parts of prepolymer to 9.57 parts of the curative (i.e. $NH_2/NCO$ ratio 0.8). At the same time air was passed into the mixing head at a gauge pressure of 80 p.s.i. The resulting stream of fine particles dispensed at the rate of 12 lb./min., was sprayed onto a vertical surface of cardboard which was partially covered by a nylon frabric. The spray to both these materials formed a waterproof coating of strong urethane elastomer.

EXAMPLE VII

Two prepolymers designated A and B respectively, were prepared from a 1200 m. wt. polypropylene ether diol and the 80/20 tolylene diisocyanate isomer mixture described in Example I. Prepolymer A was made by stirring 100 parts of the polyether with 29 parts of the tolylene diisocyanate under a blanket of nitrogen, raising the temperature to 100° C. and maintaining at this temperature for 2 hours. On cooling to room temperature the prepolymer was a syrup of NCO group content 5.10%. Prepolymer B was prepared by mixing under nitrogen 100 parts of the polyether and 5 parts of stearic acid, heating to 40° C. to dissolve the stearic acid, then stirring-in 30 parts of the diisocyanate and heating the mixture to 100° C. and maintaining at this temperature for 2 hours. When cooled to room temperature the prepolymer was a syrup of NCO group content 5.52%, which value is consistent with the reaction of each COOH group with one NCO group.

Two separate mixtures were prepared to the following formulation using Prepolymer A in the one and Prepolymer B in the other:

| | P.b.w. |
|---|---|
| Prepolymer | 100 |
| A.R. sodium chloride | 170 |
| Methyl ethyl ketone | 10 |

To the mixture containing Prepolymer A was added 8.64 parts of the liquid amine mixture of Example I ($NH_2$/NCO ratio 0.8) with rapid stirring. The resulting mixture was poured into a flat, open mould and spread by means of a doctor blade. The material gradually set and the resulting sheet was strong enough after 30 minutes for demoulding without distortion or tear. A similar procedure was followed using Prepolymer B but using 9.36 parts of the amine curative ($NH_2$/NCO ratio 0.8). This sheet was strong enough to demould without distortion or tear after only 5 minutes. The sodium chloride was leached from the sheets with hot water to give strong microporous elastomeric products readily permeable to air and moisture vapour.

EXAMPLE VIII 100 parts of Prepolymer B of Example VIII was mixed with one part of a silicone surfactant Silcocell EP 380 (ex. I.C.L. Ltd.) and 2 parts of dried titanium dioxide. Using a Mark 4A Dispenser and a Mark 7 Mechanical Mixer, both manufactured by the Viking Engineering Co., a stream of this mixture at 90° C. was blended with a stream of the liquid amine curative of Example I at 20° C. in the proportion of 100 parts of the prepolymer to 10.53 parts of the curative ($NH_2$/NCO ratio 0.9). Concurrently, dry gaseous carbon dioxide was passed into the mixing head under a feed pressure of 95 p.s.i. gauge pressure. The resulting stream of foam was dispensed at the rate of 3 lb./minute into an unheated steel shoe-sole mould. An unheated steel last fitted with a shoe upper and insole was immediately put onto the mould as the mould top. The foam had set 30 secs. after this operation and the shoe was removed from the mould as a complete integral product two minutes later. The sole, which was firmly bonded to the upper had a density of 0.60 g./cc. including the very slight skin of substantially non-cellular polyurethane. Its pore size was extremely fine.

After moulding-on the sole as above described, a series of flat test-sheets were dispensed and these gave the following test results:

| | |
|---|---|
| Density (g./cc.) | 0.60 |
| Indentation hardness (° Shore A) | 70 |
| Tensile strength (lb./sq. in.) | 813 |
| Elongation at break (percent) | 362 |
| Split tear (lb./in. width) | 44 |
| Compression set after 24 hrs. under load of 100 lb./sq. in. at 20° C. followed by 1 hour recovery (percent) | 5.0 |
| Cut growth in Hall flex test (mm.), after 150 kc. | 2 |
| Cut growth in Satra Ross flex tests after 150 kc. (mm.): | |
| At 20° C. | Nil |
| At −5° C. | Nil |

Having now described my invention, what I claim is:

1. A polyurethane prepolymer composition consisting essentially of a polyurethane prepolymer and the reaction product of a carboxylic acid with a monomeric organic polyisocyanate, said composition containing no free acid, and the carboxylic acid of said reaction product being monofunctional or di-functional.

2. A polyurethane prepolymer composition according to claim 1 in which the carboxylic acid is a saturated monocarboxylic acid.

3. A polyurethane prepolymer composition according to claim 1 in which said carboxylic acid is selected from the group consisting of acetic, propionic, stearic, malonic, succinic sebacic, maleic, fumaric, benzoic, phthalic, salicylic, lactic and monochloroacetic acid.

4. A polyurethane prepolymer composition according to claim 3 in which the carboxylic acid is acetic acid.

5. A polyurethane prepolymer composition according to claim 3 in which the carboxylic acid is stearic acid.

6. A polyurethane prepolymer composition according to claim 1 in which the carboxylic acid is a saturated dicarboxylic acid.

7. A polyurethane prepolymer composition according to claim 6 in which the carboxylic acid is sebacic acid.

8. A polyurethane prepolymer composition according to claim 1 in which the polyurethane prepolymer is the reaction product of a polypropylene ether diol and tolylene diisocyanate.

9. A polyurethane prepolymer composition according to claim 1 in which the monomeric polyisocyanate is selected from the group consisting of tolylene diisocyanate, diphenylmethane diisocyanate, paraphenylene diisocyanate, metaxylylene diisocyanate, hexamethylene diisocyanate, dicyclohexylmethane diisocyanate, naphthalene diisocyanate, tetramethylene diisocyanate, decamethylene diisocyanate, cumene diisocyanate, toluene triisocyanate, and triphenylmethane triisocyanate.

10. A polyurethane prepolymer composition according to claim 1 in which the monomeric organic polyisocyanate is tolylene diisocyanate.

11. A process for the production of a shaped article which comprises forming into the desired shape a formable composition comprising the polyurethane prepolymer composition claimed in claim 1 and a polyfunctional amine curative, and at least partially curing the formable composition.

12. A process according to claim 11 in which the formable composition is cast into the desired shape.

13. A process according to claim 11 in which the formable composition is applied to a pre-shaped article as a coating.

14. A method for the preparation of a polyurethane prepolymer composition according to claim 1 which comprises reacting a mixture of the carboxylic acid and a polymatic polyol with at least sufficient monomeric isocyanate to react with both the polymeric polyol and the carboxylic acid.

References Cited

UNITED STATES PATENTS

| 2,907,745 | 10/1959 | Greenlee | 260—2.5 |
| 3,087,900 | 4/1963 | Brown | 260—2.5 |
| 3,178,300 | 4/1965 | Gemeinhardt | 260—2.5 |
| 3,095,386 | 6/1963 | Hudson | 260—77.5 |
| 3,194,793 | 7/1965 | Kogon | 260—18 |
| 3,402,135 | 9/1968 | Schwartz et al. | 260—18 |

DONALD E. CZAJA, Primary Examiner

E. C. RZUCIDLO, Assistant Examiner

U.S. Cl. X.R.

260—2.5 A, 2.5 BD, 77.5 AM; 264—45